US006850630B1

(12) United States Patent
Barbaresco et al.

(10) Patent No.: US 6,850,630 B1
(45) Date of Patent: Feb. 1, 2005

(54) PROCESS FOR SEPARATING DYNAMIC AND STATIC COMPONENTS OF A SEQUENCE OF IMAGES

(75) Inventors: Frédéric Barbaresco, Montgeron (FR); Samuel Legoupil, Paris (FR); Bernard Monnier, Morangis (FR)

(73) Assignee: Thomson-CSF, Paris (FR)

(*) Notice: Subject to any disclaimer, the term of this patent is extended or adjusted under 35 U.S.C. 154(b) by 0 days.

(21) Appl. No.: 09/327,353

(22) Filed: Jun. 8, 1999

(30) Foreign Application Priority Data

Jun. 8, 1998 (FR) .......................................... 98 07182

(51) Int. Cl.[7] .............................. G06K 9/00; H04N 7/18
(52) U.S. Cl. ....................... 382/107; 382/103; 348/155
(58) Field of Search ................................ 382/107, 103; 348/416.1, 700, 701, 155

(56) References Cited

U.S. PATENT DOCUMENTS

| | | | | |
|---|---|---|---|---|
| 4,090,221 A | * | 5/1978 | Connor ....................... | 348/620 |
| 4,414,643 A | * | 11/1983 | Meyer ........................ | 345/440 |
| 5,216,501 A | * | 6/1993 | Ando ....................... | 348/416.1 |
| 5,572,258 A | * | 11/1996 | Yokoyama ............... | 348/415.1 |
| 5,589,884 A | * | 12/1996 | Ohguchi ................ | 375/240.03 |
| 5,631,975 A | * | 5/1997 | Riglet et al. ................ | 382/173 |
| 5,642,294 A | * | 6/1997 | Taniguchi et al. .......... | 348/700 |
| 5,729,465 A | | 3/1998 | Barbaresco | |
| 5,732,146 A | * | 3/1998 | Yamada et al. ............. | 382/107 |
| 5,801,765 A | * | 9/1998 | Gotoh et al. ................ | 348/155 |
| 5,962,844 A | * | 10/1999 | Merrill et al. ........... | 250/208.1 |
| 6,055,025 A | * | 4/2000 | Shahraray ................... | 348/700 |
| 6,130,707 A | * | 10/2000 | Koller et al. ............... | 340/511 |

FOREIGN PATENT DOCUMENTS

| | | |
|---|---|---|
| EP | 0 637 027 | 2/1995 |
| EP | 0637027 A2 * | 2/1995 ........... G11B/27/28 |
| GB | 2 282 294 | 3/1995 |

OTHER PUBLICATIONS

IBM Technical Disclosure Bulletin NA9203284 "Method of detecting scene changes in moving pictures", Mar. 1992.*

IBM Technical Disclosure Bulletin NA9309609 "Automatic adaptive coding of moving pictures", Sep. 1993.*

IBM Technical Disclosure Bulletin NN960443 "Adaptive scene change detection", Apr. 1996.*

Paragios et al., "Detecting multiple moving targets using deformable contours", IEEE International Conference on Image processing, Oct. 29, 1997.*

Bobick et al., "Real–time recognition of actvity using temporal templates", Applications of Computer Vision, 1996. WACV '96., Proceedings 3rd IEEE Workshop on, On page(s): 39–42, Dec. 2–4, 1996.*

* cited by examiner

Primary Examiner—Mehrdad Dastouri
(74) Attorney, Agent, or Firm—Oblon, Spivak, McClelland, Maier & Neustadt, P.C.

(57) ABSTRACT

A process for the separation of static and dynamic components of a sequence of images separated in time and taken under the same conditions. The process includes recording a first intensity of a first pixel in at least one area in the sequence of images, recording subsequent intensities for identical pixels to the first pixel in subsequent recorded images, and using pixel intensity sort criteria on intensity changes between the first intensity and the subsequent intensities to discriminate in the subsequent recorded images pixels showing minimal intensity changes from pixels showing larger intensity changes as the sequence process. The process includes forming from the pixels showing minimal intensity changes a part of the static component of the sequence of images.

10 Claims, 2 Drawing Sheets

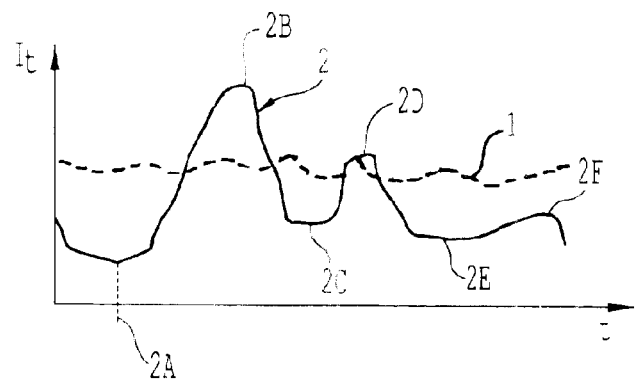
FIG. 1
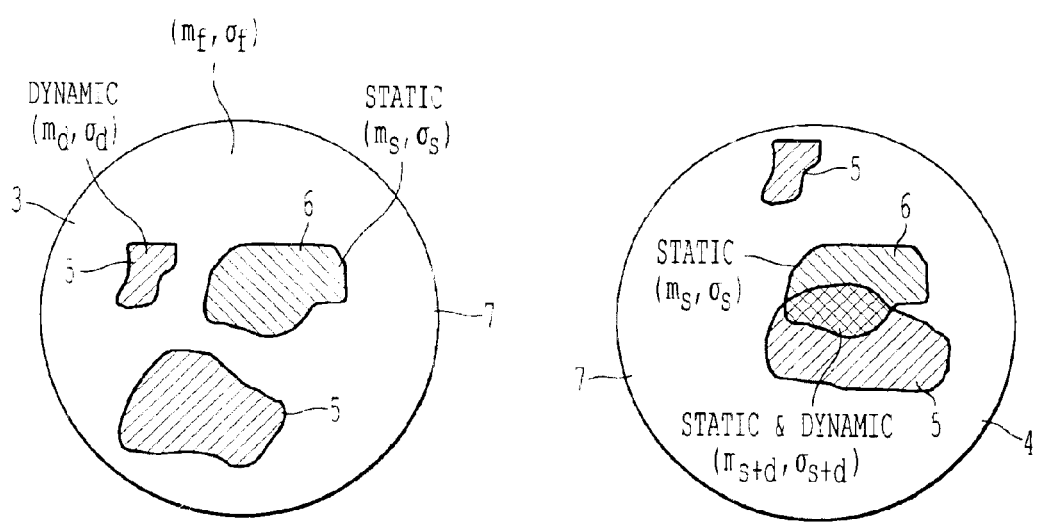
FIG. 2A  FIG. 2B

PROCESS FOR SEPARATING DYNAMIC AND STATIC COMPONENTS OF A SEQUENCE OF IMAGES

BACKGROUND AND SUMMARY OF THE INVENTION

This invention relates to a process for separating dynamic and static components of a sequence of images.

In image processing techniques, when a series of images are obtained for a variable phenomenon (for example a meteorological or biological phenomenon) taken by an appropriate sensor (weather radar, radiographic instrument, etc.) at different times but under the same conditions (fixed coordinate system), these images may comprise dynamic components characteristic of the variation of the phenomenon concerned, and static components (which do not move in space, or which at least move in space at a negligible displacement speed compared with the speed of the dynamic components). For example in the case of meteorology, these static components may include ground relief elements (mountains, buildings, etc.), and in biological applications they may include elements of the skeleton or fixed objects located on the X-ray path, etc. In most cases, the dynamic component is the only part that is interesting in the images, consequently it should be possible to eliminate the static component not only because it is not useful, but also because it may make it significantly more difficult to observe the dynamic component with which it may become confused and can even hinder this observation. However in some applications, the static component may be useful, or both of these two components may be useful, in which case it may be necessary to observe them separately. Consequently in this type of case, it must be possible to separate these two components and if necessary to eliminate one of them. Processes based on different principles are known for eliminating radar image "clutter", but they cannot make a sufficiently precise distinction between the dynamic and static components of the images obtained, particularly when these two components become coincident.

The purpose of this invention is a process for separating the static component from the dynamic component in a series of images of variable phenomena recorded under the same conditions at different times, so that one of them may be eliminated if necessary, in the most precise and reliable manner possible.

The process according to the invention consists of recording the intensity of each pixel in at least one area in the sequence of images taken at different times and under the same conditions, each time considering the same pixels in the different images, and then making use of pixel intensity sort criteria to discriminate between pixels for which the intensity varies much less than others during the sequence of images, the first pixels forming part of the static component of the images.

According to various aspects of the process according to the invention, one possible first criterion for classifying the intensity of pixels is their minimum. A second possible criterion for classifying them is the σ/m ratio of the variation in the pixel intensity, where σ is their standard deviation and m is their average. A third possible sort criterion is the spatial gradient of pixel intensities, that is included on the sequence of images with time, this criterion being used as a stop criterion for an active geodetic contour method, known in itself and described in research report No. 1075, 1989 by L. COHEN from the INRIA entitled "On active contour models".

BRIEF DESCRIPTION OF THE DRAWINGS

This invention will be better understood after reading the detailed description of several embodiments taken as non-limitative examples and illustrated by the attached drawing on which:

FIG. 1 is a diagram of an example of variations in the intensity of a pixel caused by dynamic clutter and static clutter, FIGS. 2A and 2B are diagrammatic views of two images that may be recorded at different times on a meteorological radar showing static clutter that may be masked by dynamic clutter.

DESCRIPTION OF THE PREFERRED EMBODIMENT

Figure 3:
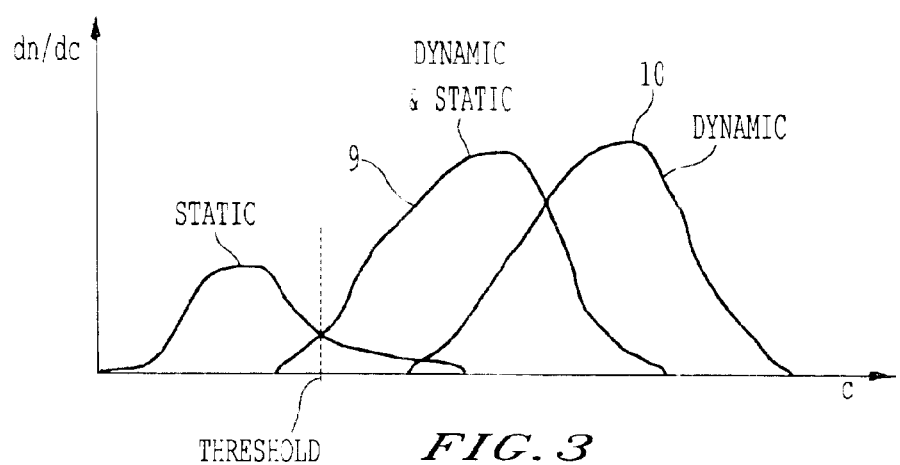
FIG. 3 is a modeled histogram showing the distribution of the individual σ/m ratios for the different pixels in an image comprising static clutter and dynamic clutter, in which static clutter is partially masked by dynamic clutter.

This invention is described below with reference to a weather radar, to eliminate static clutter, but obviously it is not restricted to this application alone, and it could be used to separate static and dynamic components in images from various sources (medical images, images from cameras working in the visible or infrared domain, images from ultrasonic sensors, etc.), so that either of these components can be used, or both components can be used separately.

The diagram in FIG. 1 shows an example of the variation of the intensity of a pixel in an image varying with time, depending on whether the pixel belongs to static "clutter" (curve 1) or dynamic "clutter" (curve 2). In this example, and subsequently since it concerns images obtained by a weather radar, static and dynamic components are qualified as static and dynamic "clutter" respectively, but as mentioned above, these components may be something other than clutter, for example images of fixed objects and mobile objects respectively. In this case, the static clutter consists of echoes from fixed obstacles (mountains, buildings, etc.), whereas dynamic clutter is essentially related to cloud masses.

In FIG. 1, it can be seen that curve 1 is close to a horizontal line around which it fluctuates, these fluctuations being due to normal fluctuations in the amplitude of radar echoes on fixed obstacles. However, curve 2 has strong amplitude variations due to cloud masses passing across the location of the pixel being considered. The strongest amplitudes recorded for this pixel occur when dense cloud masses pass, and smaller amplitudes correspond to less dense masses (for which the echo is weaker), or when there is no dynamic component.

FIGS. 2A and 2B diagrammatically show two weather radar images 3, 4. In these images, the dynamic components have been denoted as reference 5, the static components as reference 6, and the image background as reference 7. In the case shown in FIG. 2A the static and dynamic components are all distinct, whereas in FIG. 2B one of the dynamic components partially covers the static component.

One first method of separating the static components from the dynamic components according to the invention is to determine a mask of static components for a sequence of images obtained at different times, the minimum intensity for each pixel, then creating an image of these minima and subsequently thresholding it The intensity of pixels for which the dynamic clutter moves, forming part of images taken over a sufficiently long time period so that this dynamic clutter comes close to these pixels, covers them and then leaves them, will vary within very large proportions as shown on curve 2 in FIG. 1. This intensity is minimum (at 2A) (it corresponds to the background noise of echo free radar images) when these pixels are not affected by static clutter or dynamic clutter, and it is maximum (2B) when these pixels are covered by dynamic clutter, or when static clutter and dynamic clutter are superposed. This maximum is higher when the clutter is denser. Note that curve 2 in FIG. 1 comprises other minima (2C, 2E) weaker than 2A, and other maximum (2D, 2F) weaker than 2B, corresponding to local variations in the density of the dynamic clutter. In other cases (relief 6 in FIG. 2), pixels corresponding to the static clutter may momentarily be covered by dynamic clutter. In these cases, the corresponding minima are approximately equal to the average amplitude of the static clutter, in other words significantly greater than the smallest minimum (2A) of curve 2.

Consequently, in the presence of dynamic clutter, in order to determine the type of clutter corresponding to a pixel, a sufficient number of successive images (for example, several tens of images) is necessary, the time interval between the first and the last image being sufficiently long (for example several minutes) so that cloud formations have the time to travel along a large series of images, and determine the smallest minimum intensity of each pixel. The image of static clutter masks is obtained in the first image if there is no dynamic clutter since only static clutter is present. All that is necessary is to threshold this image. If the intensity of a pixel has a weak minimum and is practically constant with time, then this pixel belongs to the image background (it is neither static clutter nor dynamic clutter). If a pixel has this type of minimum, but if its intensity varies strongly with time, dynamic clutter passes through this pixel when its intensity becomes greater than this minimum. If the minimum intensity of a pixel is significantly greater than the previous minimum, and if this intensity fluctuates only slightly above this minimum, then this pixel belongs to static clutter. Finally, if the minimum intensity of a pixel is relatively high, and if its intensity increases significantly with time, this pixel also belongs to static clutter, but dynamic clutter is superposed when its intensity increases significantly. It is obvious that this function becomes more refined with time.

According to a second aspect of the process according to the invention, the ratio $c=\sigma/m$ for each pixel in an image is considered (or at least each pixel in an area of interest in this image), where $\sigma$ is the standard deviation with time and $m$ is the average intensity of the pixel considered over time. Spatial variations of the pixel could be taken into account by considering values of neighboring pixels and including them in the average and standard deviation calculations (4 or 8 neighbors). The reason is that when the histogram of an image is created, such as image 4 in FIG. 2, which forms part of a sequence of images taken at different times (comprising several tens of images), this histogram being prepared using $c=\sigma/m$, assuming that there is a sufficiently large number (more than 10) of values of $\sigma$ and $m$ associated with different image components (static, dynamic and image background), curves similar to curves 8, 9, 10 shown in FIG. 3 would be obtained with approximately gaussian shapes. These curves 8 to 10 correspond to the static component, the static plus dynamic combination, and the dynamic component respectively. This is easily understandable, since the static component has weak fluctuations around its average value (therefore its aim ratio is low), whereas the dynamic component has strong variations around its average value (which is smaller than the average value of the static component), which means that its $\sigma/m$ ratio is higher than the $\sigma$/ratio of the static component. In the case of a static+dynamic combination, variations around the average value are approximately the same as variations for the dynamic component alone, but the average value of this combination is higher than the average value of the dynamic component alone (since the average value of the static component has been added). The result is that the shape of curve 9 is approximately the same as the shape of curve 10, but its maximum is between the maximums of curves 8 and 10.

It is deduced from the analysis of curves 8 to 10 in FIG. 3 that static clutter will be detected using the histogram of the $c=\sigma/m$ ratio for all points on the image belonging to the said image sequence.

Figure 4:
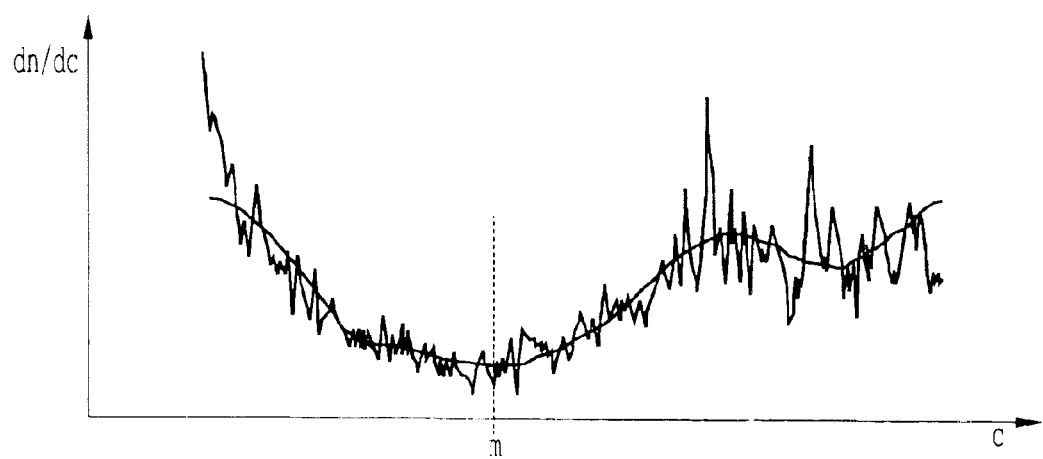
FIG. 4 is a real histogram similar to that shown in FIG. 3.

FIG. 4 shows a histogram similar to the histogram shown in FIG. 3, but is close to reality (with background noise). This histogram has been truncated to the first 150 values of C for simplification reasons (the first minimum, corresponding to the minimum m in FIG. 3) is located significantly before the $150^{th}$ value of C), with automatic thresholding of the intensity at a value $s=m_f+3.\sigma_f$ (where $m_f$ and $\sigma_f$ are the average and standard deviation for the image background). Since the histogram thus obtained has strong irregularities, it must be smoothed so that the most precise value of a significant minimum (m) can be extracted, this minimum corresponding to the delimitation between the static and dynamic components. This smoothing may be done by a tow pass filter. For example, the minimum may be determined by taking the first 128 values of C, making an inverse Fourier transform using these values, keeping the 8 "central" values of this transform, making a direct Fourier transform using these 8 values, the minimum appearing more clearly on the result of this direct transform.

A similar procedure may be used to separate the dynamic components from the static+dynamic combination (curves 10 and 9 in FIG. 3 respectively), using the most recent values of c.

Advantageously, attributes may be assigned to areas of pixels to obtain a characterization function and/or a function for identification of the static and/or dynamic components of the processed images.

What is claimed is:

1. Process for separation of static and dynamic components of a sequence of images separated in time and taken under the same conditions, comprising:

recording a first intensity of a first pixel at one specific location of at least one area in the sequence of images;

recording subsequent intensities for identical pixels at said one specific location in subsequent recorded images; and using pixel intensity sort criteria on intensity changes between the first intensity and the subsequent intensities recorded at the one specific location in the subsequent recorded images to discriminate in the subsequent recorded images between pixels of the at least one area showing minimal intensity changes and pixels of the at least one area showing larger intensity changes as the sequence progresses;

forming, from said pixels showing minimal intensity changes, a first part of the static component of the sequence of images including intensity variations, said first part having said intensity variations above a second part of the static component having only a background level of intensity variation; and forming from said pixels showing larger intensity changes a part of the dynamic component of the sequence of images.

2. Process according to claim 1, wherein the using a pixel intensity sort criteria comprises:

utilizing a minimum value of the intensity changes as the pixel sort criteria.

3. Process according to claim 1, wherein the using a pixel intensity sort criteria comprises:

utilizing a σ/m ratio of a variation of the intensity changes as the pixel sort criteria, where σ is a standard deviation and m is an average.

4. Process according to claim 1, wherein the using a pixel intensity sort criteria comprises:

utilizing a spatial gradient of said intensity changes that are integrated in time over the sequence of images as the pixel sort criteria.

5. Process according to claim 1, further comprising:

assigning attributes to pixel areas to obtain at least one of a characterization and identification function for static and dynamic components of a processed images.

6. Process according to claim 4, further comprising:

utilizing the spatial gradient of the intensity changes to determine a stop criterion when the process for separation of static and dynamic components images geodetic contours having said dynamic component in the sequence of images.

7. Process for separation of static and dynamic components of a sequence of images separated in time and taken under the same conditions, comprising:

recording a first intensity of a first pixel at one specific location of at least one area in the sequence of images;

recording subsequent intensities for identical pixels at said one specific location in subsequent recorded images; and using pixel intensity sort criteria on intensity changes between the first intensity and the subsequent intensities recorded at the one specific location in the subsequent recorded images to discriminate in the subsequent recorded images between pixels of the at least one area showing minimal intensity changes and pixels of the at least one area showing larger intensity changes as the sequence progresses;

forming from said pixels showing minimal intensity changes a part of the static component of the sequence of images; and forming from said pixels showing larger intensity changes a part of the dynamic component of the sequence of images, wherein the using pixel sort criteria comprises:

determining in said sequence of images time-varying intensities for each pixel in the at least one area;

associating a background noise component of the sequence of images to each pixel in the at least one area having a first minimum in said time-varying intensities, associating said static component of the sequence of images to each pixel in the at least one area having a second minimum having an intensity value smaller than said first minimum in said time-varying intensities, and associating said dynamic component of the sequence of images to each pixel in the at least one area having both said second minimum and said first minimum.

8. The process of claim 1, wherein the using pixel sort criteria comprises:

determining in said sequence of images for each pixel in the at least one area a ratio of a standard deviation to an average intensity of time-varying intensities for said each pixel;

associating said static component of the sequence of images to each pixel in the at least one area having a first maximum at a first value of said ratio of the standard deviation to the average intensity; and associating said dynamic component of the sequence of images to each pixel in the at least one area having a second maximum at a second value higher in value than said first value of said ratio of the standard deviation to the average intensity.

9. Process according to claim 1, wherein said forming a first part of the static component comprises:

forming said first part from pixels representing echoes from fixed obstacles.

10. Process according to claim 1, wherein said forming a part of the dynamic component comprises:

forming said part of the dynamic component from pixels representing echoes from fixed mobile objects.

* * * * *